(12) United States Patent
Kilambi et al.

(10) Patent No.: US 10,469,126 B1
(45) Date of Patent: Nov. 5, 2019

(54) CODE SYNCHRONIZATION FOR ANALOG SPREAD SPECTRUM SYSTEMS

(71) Applicants: Sai Mohan Kilambi, Ottawa (CA); Gregory John Bowles, Ottawa (CA); Lan Hu, Ottawa (CA); Tan Huy Ho, Stittsville (CA)

(72) Inventors: Sai Mohan Kilambi, Ottawa (CA); Gregory John Bowles, Ottawa (CA); Lan Hu, Ottawa (CA); Tan Huy Ho, Stittsville (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/140,156

(22) Filed: Sep. 24, 2018

(51) Int. Cl.
*H04B 1/708* (2011.01)
*H04J 13/00* (2011.01)
*H04B 1/709* (2011.01)
*H04B 7/26* (2006.01)

(52) U.S. Cl.
CPC ............ *H04B 1/708* (2013.01); *H04B 1/709* (2013.01); *H04J 13/0074* (2013.01); *H04B 7/2637* (2013.01)

(58) Field of Classification Search
None
See application file for complete search history.

(56) References Cited

U.S. PATENT DOCUMENTS

| | | | | |
|---|---|---|---|---|
| 4,028,626 A | * | 6/1977 | Motley | H04L 27/01 375/235 |
| 5,063,575 A | * | 11/1991 | Annamalai | H04L 25/4908 370/394 |
| 5,347,284 A | * | 9/1994 | Volpi | G01S 19/21 342/356 |
| 5,732,111 A | * | 3/1998 | Walley | H04L 1/20 375/140 |
| 5,940,018 A | * | 8/1999 | Kim | H03M 5/08 341/94 |

(Continued)

FOREIGN PATENT DOCUMENTS

| | | | |
|---|---|---|---|
| CN | 1104783 C | * 4/2003 | |
| WO | WO-9728612 A1 | * 8/1997 | ............. H04B 1/708 |

OTHER PUBLICATIONS

Dr. Dobb, Orthogonal Sequences, Aug. 2001—Internet Citation—.pdf.*

(Continued)

*Primary Examiner* — Berhanu Tadese

(57) ABSTRACT

Methods and apparatuses for performing synchronization in a receiver of an analog code division spreading system are described. The method includes outputting a sampling point alignment signal to apply first time delays to align encoder code signals with a sampling point of an ADC The ADC is used to obtain digital samples of the orthogonal code-encoded analog signal at the sampling point. The method also includes outputting a decoder code alignment signal to apply second time delays to align decoder code signals with the digital samples. The method also includes outputting an orthogonal code alignment signal to apply third time delays to the decoder code signals and the encoder code signals, to maintain mutual orthogonality among the decoder code signals and to maintain mutual orthogonality among the encoder code signals.

20 Claims, 8 Drawing Sheets

(56) References Cited

U.S. PATENT DOCUMENTS

| | | | | |
|---|---|---|---|---|
| 6,038,248 A * | 3/2000 | Rabaeijs | G01S 19/33 | 375/130 |
| 6,141,332 A * | 10/2000 | Lavean | H04B 1/707 | 370/208 |
| 6,301,294 B1 * | 10/2001 | Hara | H04B 1/7075 | 375/150 |
| 6,359,923 B1 * | 3/2002 | Agee | H04B 1/69 | 370/342 |
| 6,396,868 B1 * | 5/2002 | Yoon | H04B 1/707 | 375/146 |
| 6,665,308 B1 * | 12/2003 | Rakib | H03M 13/256 | 348/E7.07 |
| 6,667,708 B2 * | 12/2003 | Schooler | H04J 13/0044 | 13/44 |
| 6,680,928 B1 * | 1/2004 | Dent | H04B 1/707 | 370/208 |
| 6,765,531 B2 * | 7/2004 | Anderson | G01S 5/02 | 342/378 |
| 6,937,617 B2 * | 8/2005 | Rakib | H03M 13/256 | 348/E7.07 |
| 6,944,805 B2 * | 9/2005 | Seki | H03M 13/23 | 714/707 |
| 7,020,165 B2 * | 3/2006 | Rakib | H03M 13/256 | 348/E7.07 |
| 7,031,344 B2 * | 4/2006 | Rakib | H03M 13/256 | 370/479 |
| 7,042,926 B2 * | 5/2006 | Yellin | H04B 1/71055 | 370/335 |
| 7,088,782 B2 * | 8/2006 | Mody | H04L 1/0618 | 375/260 |
| 7,095,707 B2 * | 8/2006 | Rakib | H03M 13/256 | 348/E7.07 |
| 7,239,650 B2 * | 7/2007 | Rakib | H03M 13/256 | 348/E7.07 |
| 7,486,747 B1 * | 2/2009 | Bagley | H04B 1/7093 | 375/324 |
| 7,684,448 B2 * | 3/2010 | Li | H03M 13/2714 | 370/470 |
| 7,706,458 B2 * | 4/2010 | Mody | H04L 27/2659 | 375/260 |
| 8,428,187 B2 * | 4/2013 | Yoshimoto | H04B 1/707 | 375/316 |
| 8,989,317 B1 * | 3/2015 | Holden | H04L 25/0272 | 375/295 |
| 9,209,840 B2 * | 12/2015 | Cox | H04B 1/525 | |
| 9,699,009 B1 * | 7/2017 | Ainspan | H04L 25/4917 | |
| 2001/0001616 A1 * | 5/2001 | Rakib | H03M 13/256 | 375/259 |
| 2001/0024474 A1 * | 9/2001 | Rakib | H03M 13/256 | 375/259 |
| 2001/0046266 A1 * | 11/2001 | Rakib | H03M 13/256 | 375/259 |
| 2002/0015423 A1 * | 2/2002 | Rakib | H03M 13/256 | 370/485 |
| 2003/0016770 A1 * | 1/2003 | Trans | H04B 1/00 | 375/346 |
| 2003/0095588 A1 * | 5/2003 | Yellin | H04B 1/71055 | 375/147 |
| 2003/0122697 A1 * | 7/2003 | Schooler | H04J 13/0044 | 13/44 |
| 2003/0156603 A1 * | 8/2003 | Rakib | H03M 13/256 | 370/485 |
| 2004/0137929 A1 * | 7/2004 | Jones | G01S 5/30 | 455/517 |
| 2004/0240527 A1 * | 12/2004 | Giannakis | H04B 1/719 | 375/138 |
| 2005/0041746 A1 * | 2/2005 | Rosen | H04B 1/7163 | 375/242 |
| 2005/0084031 A1 * | 4/2005 | Rosen | H04B 1/69 | 375/295 |
| 2005/0084032 A1 * | 4/2005 | Rosen | H04B 1/7163 | 375/295 |
| 2005/0084033 A1 * | 4/2005 | Rosen | H04B 1/69 | 375/295 |
| 2005/0100076 A1 * | 5/2005 | Gazdzinski | H04B 1/7176 | 375/130 |
| 2005/0100102 A1 * | 5/2005 | Gazdzinski | H04B 1/7163 | 375/242 |
| 2005/0243897 A1 * | 11/2005 | Lomp | H04B 1/707 | 375/146 |
| 2005/0265430 A1 * | 12/2005 | Ozluturk | G06F 13/374 | 375/145 |
| 2006/0067397 A1 * | 3/2006 | Thirunagari | H04L 25/03159 | 375/232 |
| 2010/0290564 A1 * | 11/2010 | Yoshimoto | H04B 1/707 | 375/316 |
| 2012/0177159 A1 * | 7/2012 | Kong | H03L 7/07 | 375/359 |
| 2012/0263046 A1 * | 10/2012 | Wang | H04B 1/7097 | 370/252 |
| 2012/0263221 A1 * | 10/2012 | Wang | H04B 1/7113 | 375/227 |
| 2014/0349595 A1 * | 11/2014 | Cox | H04B 1/0458 | 455/78 |
| 2017/0155476 A1 * | 6/2017 | Polehn | H04L 1/08 | |

OTHER PUBLICATIONS

Lan Hu et al., "Apparatus and Receiver for Receiving RF Analog Signals", U.S. Appl. No. 15/956,499, filed Apr. 18, 2018.

Lan Hu et al., "Apparatus and Receiver for Performing Synchronization in Analog Spread Spectrum Systems", U.S. Appl. No. 15/956,338, filed Apr. 18, 2018.

Fred Tzeng et al., "A CMOS Code-Modulated Path-Sharing Multi-Antenna Receiver Front-End", IEEE Journal of Solid-State Circuits, vol. 44, No. 5, May 2009.

* cited by examiner

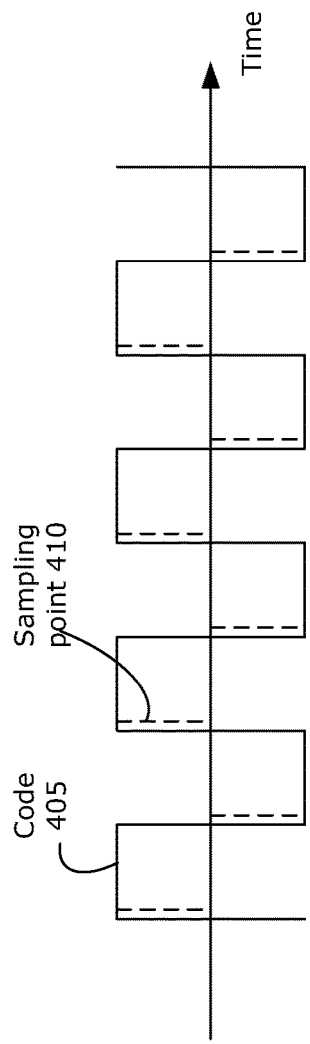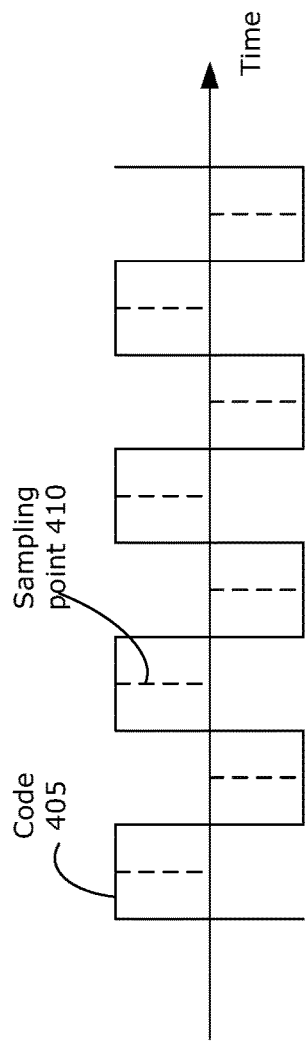
FIG. 4A
FIG. 4B

| Decoder Code 1 | | | | | | | | Inputs into decoder code aligner | | | | | | | Time delay determined |
|---|---|---|---|---|---|---|---|---|---|---|---|---|---|---|---|
| Decoder Code 1 | 1 | -1 | 1 | 1 | 1 | 1 | 1 | -1 | | | | | | | Decoder Code 1 should have time delay of 1 sampling period |
| Sign samples generated from encoder Code 1 | -1 | 1 | -1 | 1 | 1 | 1 | -1 | 1 | | | | | | | |
| Decoder Code 2 | 1 | 1 | -1 | 1 | 1 | 1 | -1 | -1 | | | | | | | Decoder Code 2 should have time delay of 1 sampling period |
| Sign samples generated from encoder Code 2 | -1 | 1 | 1 | -1 | 1 | -1 | 1 | -1 | | | | | | | |
| Decoder Code 3 | 1 | -1 | 1 | -1 | 1 | -1 | -1 | 1 | | | | | | | Decoder Code 3 should have time delay of 2 sampling periods |
| Sign samples generated from encoder Code 3 | -1 | 1 | -1 | 1 | -1 | 1 | 1 | -1 | | | | | | | |

FIG. 6

| | | | | | | | | | |
|---|---|---|---|---|---|---|---|---|---|
| Decoder Code 1 | -1 | 1 | -1 | -1 | 1 | -1 | 1 | -1 | 1 |
| Decoder Code 2 | -1 | 1 | 1 | -1 | -1 | 1 | 1 | -1 | -1 |
| Decoder Code 3 | -1 | 1 | 1 | -1 | -1 | 1 | 1 | -1 | -1 |

FIG. 7

CODE SYNCHRONIZATION FOR ANALOG SPREAD SPECTRUM SYSTEMS

FIELD

The present disclosure relates to methods and apparatuses for performing synchronization of codes in an analog spread spectrum system. Embodiments of the present disclosure relate to a receiver.

BACKGROUND

In an analog spread spectrum system, a spreading code (e.g., a pseudo-noise (PN) code) is used to spread an analog signal over a bandwidth considerably larger than the frequency content of the original signal. An analog spreading code receiver architecture, such as that described in U.S. patent application Ser. No. 15/956,338 entitled "APPARATUS AND RECEIVER FOR PERFORMING SYNCHRONIZATION IN ANALOG SPREAD SPECTRUM SYSTEMS", filed Apr. 18, 2018 or as described in U.S. patent application Ser. No. 15/956,499 entitled "APPARATUS AND RECEIVER FOR RECEIVING RF ANALOG SIGNALS", filed Apr. 18, 2018, may be used to allow superposition of multiple receiver signals (e.g., received at a multiple-input multiple-output system) in the code domain. This may provide advantages, such as scalability and/or hardware savings. In order for the superpositioned signals to be properly recovered and decoded, it is necessary for the decoder codes to be properly synchronized.

Conventionally, such as in code division multiple access (CDMA) systems, synchronization techniques are typically only implemented in a digital domain and are concerned with only digital signals. For example, cross-correlation algorithms may be used in CDMA. Such conventional approaches may not be suitable for processing spread spectrum analog signals. Accordingly, it would be desirable to provide a solution for synchronization of codes in an analog spread spectrum system.

SUMMARY

In various examples, the present disclosure describes methods and apparatuses for performing code synchronization in a receiver of an analog spread spectrum system. The synchronization may be considered to encompass three general steps. Encoder code signals are aligned with a sampling point that is used for obtaining digital samples of an orthogonal code-encoded analog signal. The decoder code signals are aligned with the digital samples. The code signals at the decoder and the code signals at the encoder are aligned to preserve mutual orthogonality.

In some examples, the present disclosure describes a method for performing synchronization in a receiver of an analog code division spreading system. The method includes outputting at least one sampling point alignment signal to apply one or more determined first time delays to encoder code signals. The encoder code signals are used by an encoder for generating an orthogonal code-encoded analog signal. The one or more first time delays are determined to align the encoder code signals with a sampling point of an analog-to-digital converter (ADC). The ADC is used to obtain digital samples of the orthogonal code-encoded analog signal at the sampling point. The method also includes outputting at least one decoder code alignment signal to apply one or more determined second time delays to decoder code signals. The decoder code signals are used by a decoder for decoding the digital samples. The one or more second time delays are determined to align the decoder code signals with the digital samples. The method also includes outputting at least one orthogonal code alignment signal to apply one or more determined third time delays to the decoder code signals and the encoder code signals. The one or more third time delays are determined to maintain mutual orthogonality among the decoder code signals and to maintain mutual orthogonality among the encoder code signals.

In any of the preceding aspects/embodiments, the method may further include: outputting a phase shift signal to control the ADC to obtain the digital samples at a determined sampling point.

In any of the preceding aspects/embodiments, the determined sampling point may be determined by: obtaining sign samples of digital samples of a known orthogonal code-encoded analog signal, the known orthogonal code-encoded analog signal being generated by encoding a known analog signal with a known encoder code; and determining the sampling point by outputting the phase shift signal to adjust the sampling point for obtaining the digital samples until the obtained sign samples match expected signs of the known encoder code.

In any of the preceding aspects/embodiments, the known analog signal may be a substantially constant analog signal.

In any of the preceding aspects/embodiments, the known encoder code may have a fastest code rate among the encoder codes.

In any of the preceding aspects/embodiments, at least one first time delay may be determined by: obtaining sign samples of digital samples of a known orthogonal code-encoded analog signal, the known orthogonal code-encoded analog signal being generated by encoding a known analog signal with a known encoder code; and determining at least one first time delay by adjusting time delay applied to a signal carrying the known encoder code until the obtained sign samples match expected signs of the known encoder code.

In any of the preceding aspects/embodiments, a plurality of first time delays may be determined, in series, for a respective plurality of signals carrying respective known encoder codes.

In any of the preceding aspects/embodiments, at least one second time delay may be determined by: obtaining sign samples of digital samples of a known orthogonal code-encoded analog signal, the known orthogonal code-encoded analog signal being generated by encoding a known analog signal with a known encoder code; and determining at least one second time delay by performing a cyclic cross correlation calculation to determine a relative shift between the obtained sign samples and the expected signs of the known decoder code, and determining the at least one second time delay to compensate for the relative shift.

In any of the preceding aspects/embodiments, a plurality of second time delays may be determined, in series, for a respective plurality of known decoder codes.

In any of the preceding aspects/embodiments, the at least one third time delay may be determined for achieving mutual orthogonality between decoder code signals having same sign rates.

In some aspects, the present disclosure describes an apparatus for performing synchronization in an analog code division spreading system. The apparatus includes a synchronizer. The synchronizer is configured to receive, from an analog-to-digital converter (ADC), digital samples of an orthogonal code-encoded analog signal, the digital samples being obtained by the ADC at a sampling point. The synchronizer is also configured to output at least one sampling point alignment signal to apply one or more determined first time delays to encoder code signals, the encoder code signals being used by an encoder for generating the orthogonal code-encoded analog signal, the one or more first time delays being determined to align the encoder code signals with the sampling point of the ADC. The synchronizer is also configured to output at least one decoder code alignment signal to apply one or more determined second time delays to decoder code signals, the decoder code signals being used by a decoder for decoding the digital samples, the one or more second time delays being determined to align the decoder code signals with the digital samples. The synchronizer is also configured to output at least one orthogonal code alignment signal to apply one or more determined third time delays to the decoder code signals and the encoder code signals, one or more third time delays being determined to maintain mutual orthogonality among the decoder code signals and to maintain mutual orthogonality among the encoder code signals.

In any of the preceding aspects/embodiments, the synchronizer may be further configured to output a phase shift signal to control the ADC to obtain the digital samples at a determined sampling point.

In any of the preceding aspects/embodiments, the synchronizer may include a sign sampler. The synchronizer may be further configured to determine the determined sampling point by: obtaining, by the sign sampler, sign samples of digital samples of a known orthogonal code-encoded analog signal, the known orthogonal code-encoded analog signal being generated by encoding a known analog signal with a known encoder code; and determining the sampling point by outputting the phase shift signal to adjust the sampling point for obtaining the digital samples until the obtained sign samples match expected signs of the known encoder code.

In any of the preceding aspects/embodiments, the synchronizer may include a sign sampler. The synchronizer may be further configured to determine at least one first time delay by: obtaining, by the sign sampler, sign samples of digital samples of a known orthogonal code-encoded analog signal, the known orthogonal code-encoded analog signal being generated by encoding a known analog signal with a known encoder code; and determining at least one first time delay by adjusting time delay applied to a signal carrying the known encoder code until the obtained sign samples match expected signs of the known encoder code.

In any of the preceding aspects/embodiments, the synchronizer may include a sign sampler. The synchronizer may be further configured to determine at least one second time delay by: obtaining, by the sign sampler, sign samples of digital samples of a known orthogonal code-encoded analog signal, the known orthogonal code-encoded analog signal being generated by encoding a known analog signal with a known encoder code; and determining at least one second time delay by performing a cyclic cross correlation calculation to determine a relative shift between the obtained sign samples and the expected signs of the known decoder code, and determining the at least one second time delay to compensate for the relative shift.

In any of the preceding aspects/embodiments, the apparatus may also include a decoder configured to decode the digital samples, using the decoder code signals.

In any of the preceding aspects/embodiments, the apparatus may also include one or more decoder delay adjustment blocks, wherein the synchronizer is configured to output the at least one decoder code alignment signal and the at least one orthogonal code alignment signal to the one or more decoder delay adjustment blocks.

In some aspects, the present disclosure describes a receiver in an analog code division spreading system. The receiver includes a plurality of receiving paths for receiving respective analog signals, each receiving path including a respective orthogonal code-encoder to perform encoding using a respective encoder code signal. The receiver also includes a combiner for combining a plurality of signals outputted by the orthogonal code-encoders into a combined orthogonal code-encoded analog. The receiver also includes an analog-to-digital converter (ADC) for obtaining digital samples of the combined orthogonal code-encoded analog signal at a sampling point. The receiver also includes a decoder for decoding the digital samples using decoder code signals. The decoder includes a synchronizer that is configured to output at least one sampling point alignment signal to apply one or more determined first time delays to the encoder code signals, the one or more first time delays being determined to align the encoder code signals with the sampling point of the ADC. The synchronizer is also configured to output at least one decoder code alignment signal to apply one or more determined second time delays to the decoder code signals, the one or more second time delays being determined to align the decoder code signals with the digital samples. The synchronizer is also configured to output at least one orthogonal code alignment signal to apply one or more determined third time delays to the decoder code signals and encoder code signals, the one or more third time delays being determined to maintain mutual orthogonality among the decoder code signals and to maintain mutual orthogonality among the encoder code signals.

In any of the preceding aspects/embodiments, the receiver may also include a known analog signal source for providing a known analog signal; and a plurality of multiplexers, each multiplexer corresponding to a respective one receiving path, each multiplexer being configured to selectively provide the known analog signal or the respective received analog signal to the respective encoder on the receiving path.

In any of the preceding aspects/embodiments, the receiver may also include a plurality of switches, each switch corresponding to a respective transmission path for transmitting a respective encoder code signal to a respective encoder, each switch being configured to selectively enable or disable transmission of the respective encoder code signal to the respective encoder.

BRIEF DESCRIPTION OF THE DRAWINGS

Reference will now be made, by way of example, to the accompanying drawings which show example embodiments of the present application, and in which:

FIGS. 4A and 4B illustrate ADC sampling at different sampling points;

FIG. 6 is a table that illustrates an example of how decoder code signals are aligned with encoder code signals;

FIG. 7 is a table that illustrates the result after aligning the example decoder code signals of FIG. 6.

Similar reference numerals may have been used in different figures to denote similar components.

DESCRIPTION OF EXAMPLE EMBODIMENTS

In some embodiments discussed in the present disclosure, at a receiver, multiple received signals, received over multiple receiving paths, are modulated (i.e., encoded) using orthogonal codes and combined. The combined signal is sampled, and subsequently decoded to separate out the individual received signals. Combining the received signals into a combined signal may allow for any or all of savings in power consumption, space savings, hardware savings, and reduced cross-talk. In order to facilitate recovery of the received signals at the decoder, the signals carrying the codes used at the encoder (also referred to as encoder code signals) should be synchronized with the other encoder code signals in order to ensure mutual orthogonality in the set of code signals. Further, the signals carrying the codes used at the decoder (also referred to as decoder code signals) should be synchronized with the encoder code signals to ensure proper decoding can occur. Synchronization may also be performed with respect to the digital sampling, to ensure that the combined signal is properly sampled. The present disclosure provides methods and apparatuses for carrying out such synchronization.

In general, examples described in the present disclosure may be implemented in the receiver of any communication system that receives multiple signals over multiple receiving paths. The examples disclosed here may be implemented in various applications, including in electronic devices, such as user equipment (UE) or base stations, for wired or wireless communications. Although described in the context of a receiver, aspects of the present disclosure may also be implemented as an apparatus that performs decoding, including performing synchronization, as discussed further below.

Figure 1:
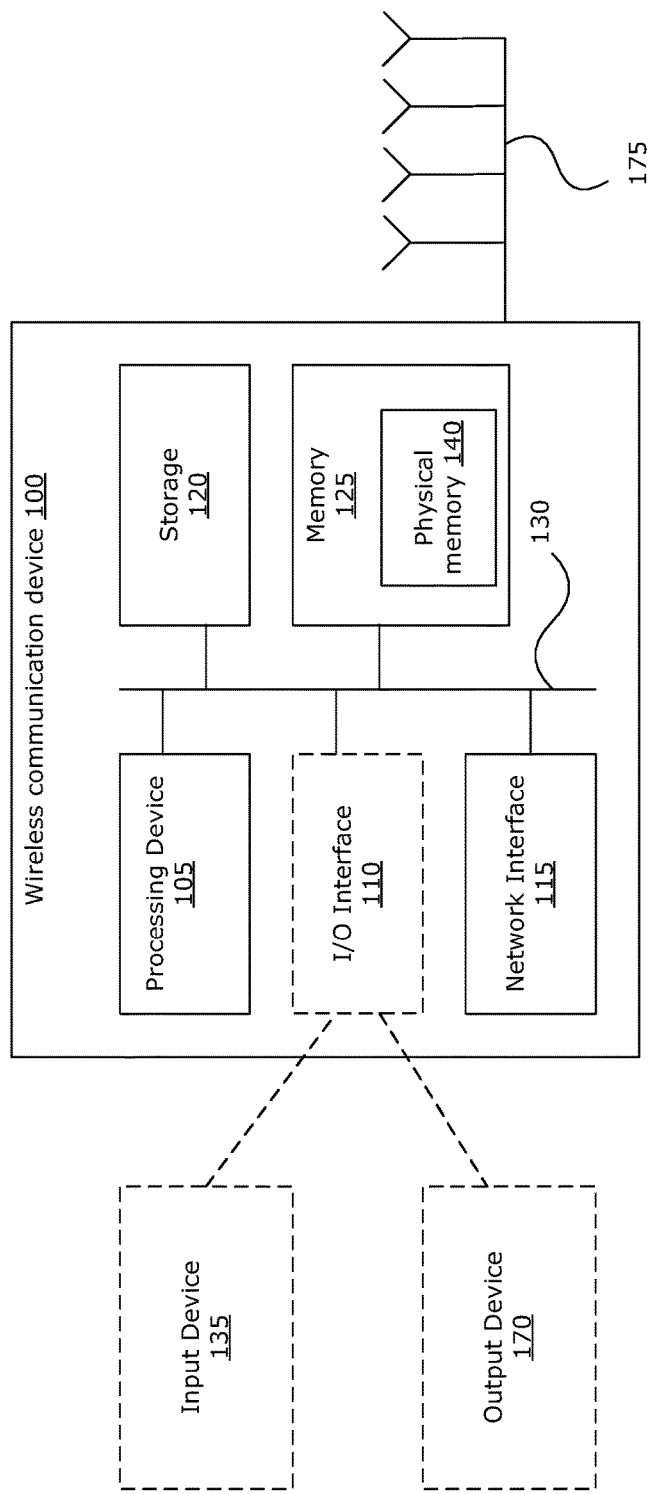
FIG. 1 is a schematic diagram of an example wireless communication device, which may be used in an analog spread spectrum system.

FIG. 1 is a schematic diagram of an example wireless communication device 100, in which examples described herein may be implemented. For example, the wireless communication device 100 may be an electronic device, such as a UE or a base station, in a wireless communication network. The wireless communication device 100 may be used for communications within 5G communication networks as well as predecessor and successor wireless networks. Other communication devices (including communication devices for wired or wireless communications) may also be suitable for implementing examples described herein, and which may include components different from those described with respect to FIG. 1. Although FIG. 1 shows a single instance of any illustrated component, there may be multiple instances of each component in the wireless communication device 100. The wireless communication device 100 may be implemented using parallel and/or distributed architecture.

The wireless communication device 100 may include one or more processing devices 105, such as a processor, a microprocessor, a Digital Signal Processor (DSP), an application-specific integrated circuit (ASIC), a field-programmable gate array (FPGA), a dedicated logic circuitry, or combinations thereof. The wireless communication device 100 may also include one or more optional input/output (I/O) interfaces 110, which may enable interfacing with one or more optional input devices 135 and/or output devices 170. The wireless communication device 100 may include one or more network interfaces 115 for wired or wireless communication with a network (e.g., an intranet, the Internet, a peer-to-peer (P2P), network, a wide area network (WAN) and/or a local area network (LAN), and/or a Radio Access Network (RAN)) or other node. The network interface(s) 115 may include one or more interfaces to wired networks and wireless networks. Wired networks may make use of wired links (e.g., Ethernet cable). Wireless networks, where they are used, may make use of wireless connections over a plurality of antennas 175. The network interface(s) 115 may provide wireless communication via one or more transmitters or transmit antennas and one or more receivers or receive antennas, for example. In this example, a plurality of antennas 175 is shown. The plurality of antennas 175 may serve as an antenna array. In other examples, the wireless communication device 100 may use one antenna 175, which may provide both receiving and transmitting functions. The wireless communication device 100 may also include one or more storage units 120, which may include a mass storage unit such as a solid state drive, a hard disk drive, a magnetic disk drive and/or an optical disk drive.

The wireless communication device 100 may include one or more memories 125 that can include a physical memory 140, which may include a volatile or non-volatile memory (e.g., a flash memory, a random access memory (RAM), and/or a read-only memory (ROM)). The non-transitory memory(ies) 125 (as well as storage 120) may store instructions for execution by the processing device(s) 105, such as to carry out processing such as the example methods described in the present disclosure. The memory(ies) 125 may include other software instructions, such as for implementing an operating system (OS), and other applications/functions. In some examples, one or more data sets and/or modules may be provided by an external memory (e.g., an external drive in wired or wireless communication with the wireless communication device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 130 providing communication among components of the wireless communication device 100. The bus 130 may be any suitable bus architecture including, for example, a memory bus, a peripheral bus or a video bus. Optional input device(s) 135 (e.g., a keyboard, a mouse, a microphone, a touchscreen, and/or a keypad) and optional output device(s) 170 (e.g., a display, a speaker and/or a printer) are shown as external to the wireless communication device 100, and connected to optional I/O interface 110. In other examples, one or more of the input device(s) 135 and/or the output device(s) 170 may be included as a component of the wireless communication device 100.

The apparatus or receiver described herein may be included as a component of the wireless communication device 100, for example as a component for receiving RF analog signals using the antennas 175. The processing device(s) 105 may also be used to control operation of the receiver. For example, the processing device(s) 105 may control or perform one or more functions of the synchronization module described below.

The present disclosure describes an example method of code synchronization, which may be implemented by a synchronization module, decoder or receiver, for example. The disclosed synchronization method may be considered to involve three phases or steps. Signals carrying the codes used at the encoder (also referred to as encoder code signals) are aligned with a sampling point of an analog-to-digital converter (ADC), to ensure proper sampling of an encoded analog signal. In some examples, the synchronization method may include controlling the ADC to obtain digital samples of the encoded analog signal at a determined sampling point. This control of the ADC may also be referred to as ADC phase shift control or clock phase adjustment, or more simply as phase shift control. The disclosed synchronization method also includes aligning signals carrying the codes used at the decoder (also referred to as decoder code signals) with the encoder code signals to ensure proper decoding. This aligning of decoder and encoder code signals may also be referred to as synchronization of the decoder and encoder, or more simply as decoder code alignment. The disclosed synchronization method also includes aligning encoder code signals with each other, to ensure mutual orthogonality is maintained. This aligning of encoder code signals with each other may also be mirrored by corresponding aligning of decoder code signals with each other, and may generally be referred to as relative code synchronization, or more simply as orthogonal code alignment.

In some examples, the disclosed synchronization method may be based on sign-sampling. Sign-sampling may be implemented using a relatively simple digital circuit. Sign-sampling may be used to provide a relatively simple basis for determining the sampling point and for aligning codes, as described below. In other examples, techniques other than sign-sampling may be used (e.g., synchronization based on amplitude-sampling instead).

Figure 2:
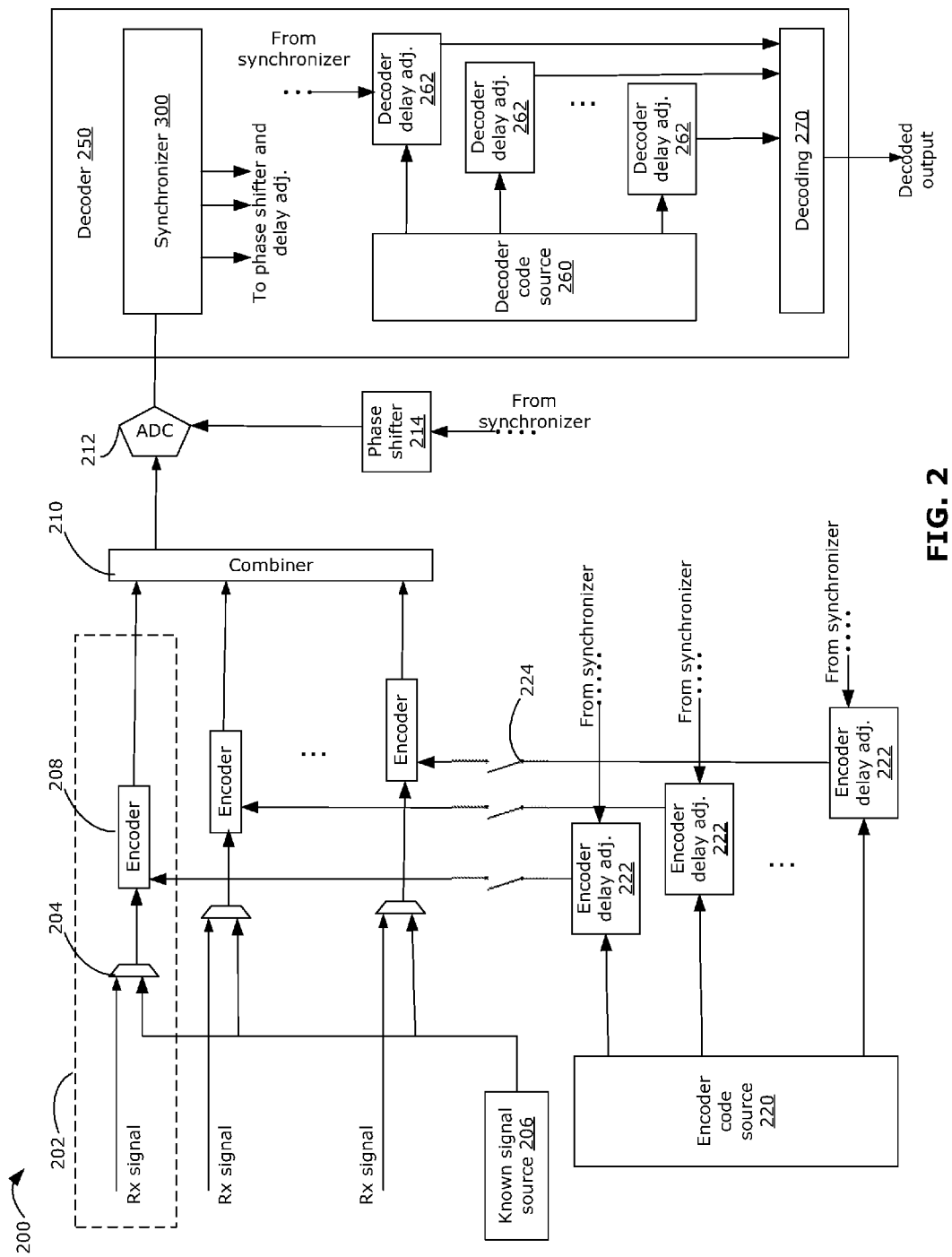
FIG. 2 is a schematic diagram of an example receiver for performing code synchronization.

FIG. 2 is a schematic diagram of an example receiver 200 in accordance with an example embodiment. Examples described herein may be implemented using the receiver 200. The receiver 200 includes a plurality of receiving (Rx) paths 202 (one of which is indicated by a dashed box) on which a plurality of analog signals (indicated generally as Rx signal) are received and processed. The receiver 200 may receive wireless signals or wired signals over the Rx paths 202. The number of Rx paths 202 being used corresponds to the number of analog signals received.

Each Rx path 202 includes a multiplexer (mux) 204 (or other selector, such as a switch) for selecting between the Rx signal and a known signal from a known signal source 206 to be provided to an orthogonal code-encoder 208 (also referred to herein simply as encoder 208). Both the Rx signal and the known signal are analog signals, and the mux 204 (or other selector) is also an analog component. The output of the encoder 208 is an orthogonal code-encoded analog signal, which may also be considered to be the output of the Rx path 202. Each Rx path 202 may include other components, such as filters and/or amplifiers, to process the Rx signal as appropriate. Such components have been omitted from FIG. 2 for simplicity. Each encoder 208 uses a respective orthogonal code to perform encoding. The orthogonal code may also be referred to as a spreading code. For example, the encoders 208 may use mutually orthogonal pseudo-noise (PN) codes, Walsh codes, Gold codes, or other orthogonal codes.

The orthogonal code-encoded analog signals from the plurality of Rx paths 202 are combined together at a combiner 210, into a combined analog signal. Because the orthogonal code-encoded analog signals have been encoded using mutually orthogonal codes, the orthogonal code-encoded analog signals can be individually separated from the combined analog signal. The combined analog signal is then digitally sampled by an ADC 212. The ADC 212 outputs the digital samples to a decoder 250, which recovers the individual analog signals by performing decoding using the same set of orthogonal codes that was used by the encoders 208. Ideally, the decoded output from the decoder 250 is a set of digital signals that correspond to the Rx signals that were received on the Rx paths 202. The present disclosure describes an example synchronization method (which may be at least partly performed by a synchronizer 300 in the decoder 250) to help ensure that the Rx signals are properly recovered.

It should be noted that FIG. 2 illustrates an example in which signals are processed over a single channel, such as would be appropriate for processing of real signals. As would be appreciated by a person skilled in the art, the architecture shown in FIG. 2 may be modified for processing of in-phase (I) and quadrature phase (Q) signals, for example by providing a second channel (and corresponding second set of components) for processing the I and Q signals separately. For ease of understanding, the figures and the description herein will refer to real signals, however this is not intended to be limiting.

Figure 3:
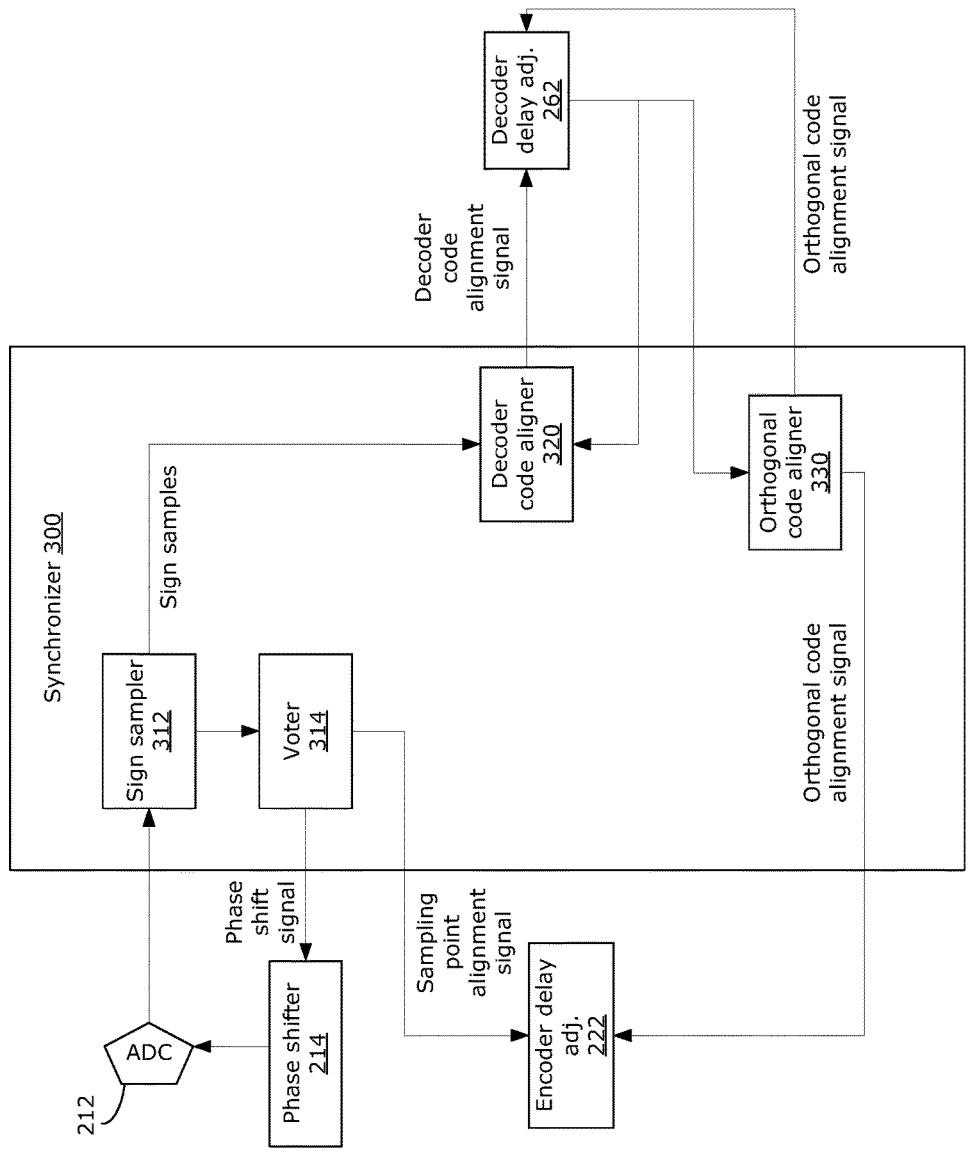
FIG. 3 is a schematic diagram of an example synchronization module.

The example synchronization is now described with reference to FIGS. 2 and 3. FIG. 3 shows details of the synchronizer 300, with certain components of the receiver 200 omitted for ease of understanding. Further, FIG. 3 shows only one instance of the encoder delay adjustment block 222 and only one instance of the decoder delay adjustment block 262, for ease of understanding, however it should be understood that there may be a plurality of encoder delay adjustment blocks 222 and a plurality of decoder delay adjustment blocks 262, as shown in FIG. 2. The synchronization may be performed by the synchronizer 300 (also referred to as a synchronization module), which may be implemented in digital logic as part of the decoder 250. The synchronizer 300 outputs signals to control a phase shifter 214 and delay adjustment blocks 222, 262, in order to synchronize the ADC 212 as well as to synchronize the encoder and decoder code signals.

The encoders 208 use encoder code signals which are provided by an encoder code source 220. The encoder code source 220 may be any suitable source that provides signals carrying the orthogonal encoder codes, for example using a high speed digital logic. Relative delays between the encoder code signals may be adjusted using encoder delay adjustment blocks 222, such that the encoder code signals are aligned with each other. The encoder delay adjustment blocks 222 may be implemented in digital logic (e.g., using suitable digital circuit components). The aligned encoder code signals are then used by the encoders 208, so that the outputs of the encoders 208 are aligned. Because the paths from the encoders 208 to the combiner 210 are relatively short, it is expected that the orthogonal code-encoded analog signals arriving at the combiner 210 will also be aligned with respect to each other. Similarly, the decoder 250 uses decoder code signals which are provided by a decoder code source 260. The decoder code signals should be the same as the encoder code signals, in order to recover the Rx signals. Relative delays between the decoder code signals may be adjusted using decoder delay adjustment blocks 262, such that the decoder code signals are aligned with each other and also with the encoder code signals. The decoder 250 and its component blocks may be implemented using digital logic (e.g., using suitable digital circuit components).

Although FIG. 2 shows separate encoder delay adjustment blocks 222 for adjusting the time delays of respective encoder code signals, it should be understood that in some examples the time delays may be applied using a single encoder delay adjustment block 222. For example, a single encoder delay adjustment block 222 may be used to apply different time delays to different encoder code signals. Similarly, the time delays of respective decoder code signals may be applied using a single decoder delay adjustment block 262 instead of a plurality of decoder delay adjustment blocks 262. For example, a single decoder delay adjustment block 262 may be used to apply different time delays to different decoder code signals. In some examples, where the time delay is applied using circuitry such as shift registers or a first-in-first-out (FIFO) circuit, separate delay adjustment blocks may be used for applying each time delay.

In some examples, where the ADC clock is adjusted to obtain samples at a determined sampling point, the synchronizer 300 outputs a phase shift signal to control the ADC clock, so that the ADC 212 obtains digital samples at the determined sampling point. In other examples, the synchronizer 300 may not adjust the ADC clock, and the phase shift signal (and possibly also the phase shifter 214) may be omitted. The synchronizer 300 also outputs various alignment signals, which cause appropriate time delays to be applied to the encoder and decoder code signals, in order to align the encoder and decoder code signals and to preserve mutual orthogonality of the codes.

Synchronization (which may also be referred to as calibration) may be performed to compensate for misalignment of codes which may be caused by differences in path delays, for example. Such misalignment is typically relatively static (e.g., exhibiting little or no drift over a long period of time, such as over a 24-hour period). Accordingly, determination of appropriate time delays and optionally determination of the appropriate sampling point at the ADC may not need to be performed very frequently. For example, determination of appropriate time delays and optionally determination of the appropriate sampling point may be carried out by the synchronizer 300 during a calibration phase. The calibration phase may take place prior to receiving and processing Rx analog signal, and performed using a known signal (also referred to as a pilot signal). For example, the calibration phase may take place at a time associated with an even such as at least one of initialization of the receiver 200 (e.g., when a communication device containing the receiver 200 is first powered on), expiry of a periodic interval (e.g., once a day), in response to changes in signal processing (e.g., changing to a different orthogonal code) and in response to detection of environmental changes (e.g., detection of a significant temperature change). In some examples, the synchronization may be performed in response to receipt of an instruction to synchronize (e.g., a processor controlling the receiver 200 may instruct the receiver 200 to perform calibration). For example, if a need for synchronization is detected (e.g., an environmental change is detected) during reception of analog signals, the receiver 200 may be instructed to perform synchronization after the current reception of analog signals is complete.

The performance of the analog spread spectrum typically is affected by the sampling point of the ADC 212. It is generally desirable for the ADC 212 to obtain digital samples at or close to the eye of the orthogonal codes. However, at startup, the sampling point of the ADC 212 is typically initialized at an unknown point relative to the edges of the codes. If, as shown in FIG. 4A, the sampling point 410 is close to the edge of the code 405, there is a risk that at least one of noise and a rising/falling edge will cause an incorrect value to be obtained for the digital sample. Synchronization aims to align the code 405 (and optionally adjust the clock phase of the ADC 212) so that the sampling point 410 is at or close to the eye of the code 405, as shown in FIG. 4B. This increase the likelihood that the correct value is obtained for the digital sample. It should be noted that, as shown in FIGS. 4A and 4B, the clock rate of the ADC 212 is twice that of the code rate. In other examples, a faster ADC clock rate may be used, and the output of the ADC 212 may be sampled accordingly to ignore or avoid duplicate samples. Generally, a well-defined integral multiple (typically a power of 2) of the code rate can be used as the ADC clock rate. Higher ADC clock rates may result in needless oversampling, which may be undesirable and may increase complexity.

Reference is again made to FIGS. 2 and 3. As mentioned above, synchronization may be performed using a known analog signal in place of Rx signals. The known analog signal may be, for example, a direct current (DC) signal (e.g., the known signal source 206 may be a DC source) or a slow-varying alternating current (AC) signal (e.g., the known signal source 206 may be a low frequency AC source). The muxes 204 are used to feed the known analog signal to the encoders 208 instead of Rx signals. Aligning the encoder code signals to the sampling point of the ADC may be performed by considering one encoder code signal at a time. There may be a plurality of switches 224 (which may be implemented as digital muxes or as analog switches, for example), each of which may be provided on a respective encoder code signal transmission path, to selectively enable or disable transmission of an encoder code signal to a respective encoder 208. For example, the synchronizer 300 may control the switches 224, such that one signal carrying a known encoder code is fed to one encoder 208 and all other code signals are turned off. The output of the one encoder 208 is the known analog signal modulated by the selected one encoder code. Because both the selected encoder code and the known analog signal are known, the orthogonal code-encoded analog signal that is outputted by the one encoder 208 is also a known signal. Because all other codes are turned off, the output of the ADC 212 is a digital sample of the known orthogonal code-encoded analog signal. Accordingly, it is possible to align the signal carrying the selected encoder code, such that the digital sample is a correct digital representation of the known orthogonal code-encoded analog signal.

Figure 5:
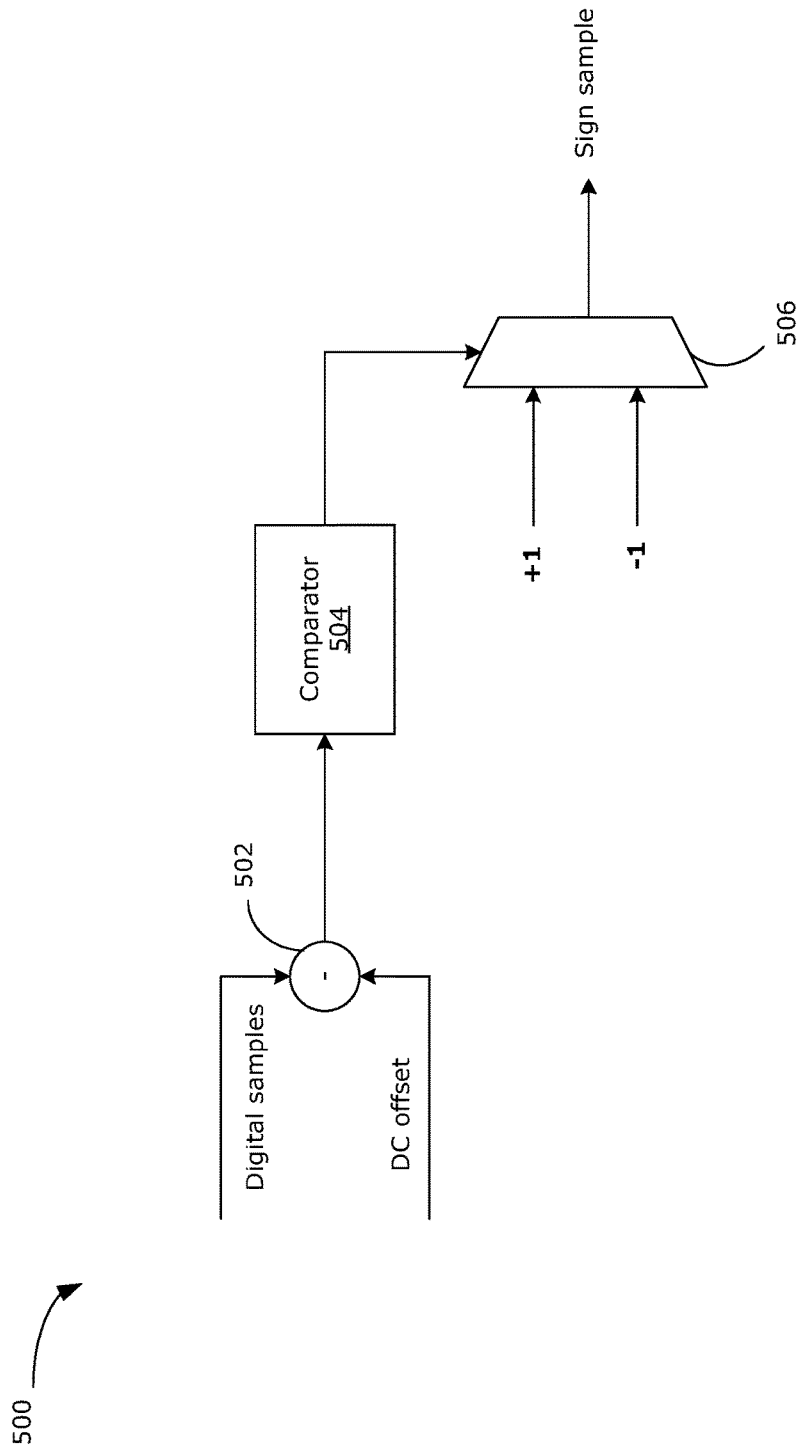
FIG. 5 is a schematic diagram of an example sign sampling circuit, which may be implemented in the synchronization module of FIG. 3.

In the example shown, the synchronizer 300 uses a sign sampler 312 to perform sign-sampling on the digital samples outputted by the ADC 212. The sign sampler 312 outputs the sign (positive or negative) of each digital sample. FIG. 5 is an example digital circuit 500 that may be used to implement the sign sampler 312. In the example circuit 500, any DC offset (which may be determined using any suitable algorithm) is subtracted from the digital samples at a subtractor 502. The result is then compared with zero (0) at a comparator 504. If the result is greater than or equal to zero (0), the comparator 504 controls a mux 506 to output a +1 value as the sign sample. If the result is less than zero (0), the comparator 504 controls the mux 506 to output a −1 value as the sign sample.

The sign samples from the sign sampler 312 are outputted to a voter 314 block that determines (e.g., using a confidence interval algorithm or an equal vote algorithm) whether the sign samples match the signs that are expected for the known encoder code. For an example encoder code that is known to change signs every clock cycle, the sign samples are expected to alternate between positive and negative. For example, a voter 314 using a confidence interval algorithm may determine if the sign samples alternative between positive and negative at every clock cycle, within a predetermined confidence interval. In another example, a voter 314 using an equal vote algorithm may determine if there are equal numbers of positive and negative samples within a predetermined time period.

In some examples, for one encoder code signal, aligning the encoder code signal with the ADC sampling point may involve adjusting the clock phase of the ADC until an appropriate sampling point is determined. In such a case, if the voter 314 determines that the sign samples do not match what is expected for the known encoder code, the voter 314 outputs a phase shift signal to the phase shifter 214, to change the sampling point of the ADC 212. Typically, the phase shift signal causes a small phase shift in the sampling point. The sign sampler 312 and voter 314 can repeat sign sampling and evaluation of the sign samples, shifting the sampling point of the ADC 212 until the voter 314 determines that the sign samples match what is expected for the known encoder code. The sampling point where the sign samples match what is expected for the known encoder code is the determined sampling point where the ADC 212 is synchronized. In this way, the synchronizer 300 performs a phase search to determine the appropriate sampling point for the ADC 212.

It should be noted that the voter 314 may be configured to accommodate known encoder codes that do not alternate signs at every clock interval (e.g., an encoder code that alternates signs at every two clock intervals). The known encoder code that is used to determine the sampling point of the ADC 212 may be selected from among the codes having the fastest code rate among all the encoder codes. In some embodiments discussed in the present disclosure, code rate refers to the rate at which a code changes values or symbols. Sign rate (the rate at which a code switches signs between positive and negative) is one example of a code rate. For example, the encoder code that is used to determine the sampling point may be an encoder code that is known to switch signs at every bit. In this way, it can be ensured that the determined sampling point will also be satisfactory for slower encoder codes.

After the ADC 212 has been calibrated for one signal carrying the known encoder code (which may be the encoder code having the fastest code rate), the determined sampling point has been set. The remaining encoder code signals can then be aligned, using a sampling point alignment signal, to control encoder delay adjustment blocks 222 to apply a set of appropriate time delays to the remaining encoder code signals so that the sampling point falls at or close to the middle of the eye for each remaining encoder code signal. As one skilled in the art will appreciate, after aligning the decoder side to the first encoder code signal, the remaining encoder code signals can be aligned to the first encoder code signal.

For example, after the sampling point of the ADC 212 has been set using one known encoder code, another signal carrying a second known encoder code is fed to one encoder 208 and all other codes are turned off (e.g., by controlling the switches 224 accordingly). The output of the one encoder 208 is now the known analog signal modulated by the second known encoder code. As described above, the sign sampler 312 and voter 314 may be used to determine whether the signal carrying the second known encoder code is being sampled at a satisfactory sampling point. If not, then the sampling point alignment signal is outputted by the synchronizer 300 to control the encoder delay adjustment block 222 to shift the time delay of the second known encoder code signal. Typically, the sampling point alignment signal causes a small time shift in the second known encoder code signal. The sign sampler 312 and voter 314 repeat sign sampling and evaluation of the sign samples, shifting the time delay of the second known encoder code signal until the voter 314 determines that the sign samples match what is expected for the second known encoder code. In this way, the synchronizer 300 performs a time delay search to align the second known encoder code signal with the determined sampling point. This process is then repeated for each other encoder code signal. The performance of this encoder code signal alignment may be improved by ensuring that the paths traveled by the encoder code signals are well matched.

In some examples, the ADC 212 may not be adjusted by a phase shift signal. Instead of adjusting the ADC 212, each encoder code signal may be aligned with the sampling point of the ADC 212 (e.g., wherever the sampling point is at when the ADC 212 is initialized), as described above, such that the digital samples obtained by the ADC 212 are obtained at or close to the middle of the code eye for each encoder code signal.

After the sampling point of the ADC 212 has been optionally determined and set, and after the encoder code signals have all been aligned with the sampling point of the ADC, the decoder code signals are to be synchronized with the encoder code signals. This may be performed by a decoder code aligner 320 of the synchronizer 300. It should be noted that, although described as synchronizing or aligning of the decoder code signals with the encoder code signals, the decoder code signals may not be exactly aligned with the encoder code signals. It may be sufficient that the decoder code signals are lined up close enough with the encoder code signals such that the digital samples from the ADC 212 line up with the decoder code signals. That is, the decoder and encoder code signals may be aligned only up to the sampling period of the ADC 212. This may be considered as the decoder code signals being sufficiently aligned with the encoder code signals.

Similar to the above-described process for aligning encoder code signals, the encoder code signals are considered one at a time (e.g., using appropriate control of the switches 224) to align each corresponding decoder code signal one at a time. The decoder code aligner 320 compares the sign samples of the digital samples of a known orthogonal code-encoded analog signal (which is simply the known analog signal that is encoded by one known encoder code) with the expected signs of the signal carrying the corresponding known decoder code (with any time delays as outputted from the decoder delay adjustment block 262). Because the orthogonal codes are periodic in nature, the decoder code aligner 320 may perform cyclic cross correlation calculations to determine the relative time difference between each encoder code signal and the corresponding decoder code signal. The cyclic cross correlation calculation provides a result indicating the relative time different, in terms of the number of samples shifted. For example if the encoder code signal is ahead by one sample with respect to the decoder code signal, the result from the cyclic cross correlation calculation may be a value of 1. This indicates to the decoder code aligner 320 that a time delay of one clock cycle is required to align the decoder code signal with the encoder code signal. The decoder code aligner 320 then outputs a decoder code alignment signal to the decoder delay adjustment block 262 to apply the appropriate time delay to the known decoder code signal, so that the signal carrying the known decoder code aligns with the corresponding encoder code signal. This process is repeated until appropriate time delays have been applied to all the decoder code signals, to align the decoder code signals with the corresponding encoder code signals.

It should be appreciated that, because the decoder code signals are being aligned with the sign samples obtained from the output of the ADC 212, any path delays along the path from the encoder code signal source to the ADC output are inherently taken into account. Thus, although referred to as aligning the decoder code signals with encoder code signals (for simplicity), the decoder code signals are in fact being aligned with the encoder code signals after experiencing any path delays from the encoder source to the ADC output.

Although the alignment of decoder code signals (performed by the decoder code aligner 320) has been described as being performed after the encoder code signals have all been aligned with the sampling point of the ADC, in some examples the alignment of decoder code signals may take place in parallel with alignment of the encoder code signals. For example, each time an encoder code signal has been aligned with the sampling point, the corresponding decoder code signal may then be aligned with the encoder code signal.

FIG. 6 is a table that illustrates an example of how the appropriate time delay may be determined using the decoder code aligner 320. In the example of FIG. 6, three signals carrying known decoder codes—namely decoder Code 1, decoder Code 2 and decoder Code 3—are to be aligned with the corresponding three known encoder code signals—namely encoder Code 1, encoder Code 2 and encoder Code 3, respectively. As illustrated in FIG. 6, the decoder code aligner 320 receives each decoder code signal and the sign samples generated using the corresponding encoder code signal. Based on the cyclic cross correlation calculation, the decoder code aligner 320 determines that a time delay of one sampling period should be applied to decoder Code 1; a time delay of one sampling period should be applied to decoder Code 2; and a time delay of two sampling periods should be applied to decoder Code 3.

FIG. 7 illustrates the result after aligning the example decoder code signals of FIG. 6. Alignment of the decoder code signals with the encoder code signals may result in loss of mutual orthogonality among the decoder code signals. For example, the dashed box in FIG. 7 illustrates a loss of orthogonality between decoder Code 2 and decoder Code 3, after decoder Code 2 and decoder Code 3 have been aligned with the respective encoder code signals.

Reference is again made to FIGS. 2 and 3. An orthogonal code aligner 330 in the synchronizer 300 may be used to align the decoder code signals. This aids in maintaining mutual orthogonality among the decoder code signals. Although shown in the figures as a separate block, in some examples the orthogonal code aligner 330 and the decoder code aligner 320 may be implemented as a single functional block. The orthogonal code aligner 330 may consider all the decoder code signals in parallel, or may consider the decoder code signals in series. Generally, the decoder codes are known, as is the relationship between the decoder codes (e.g., relative bit-shift) that is required to achieve mutual orthogonality. Accordingly, the orthogonal code aligner 330 may compare the decoder code signals that have been aligned according to the decoder code alignment signal, and determine any further adjustment that is required to recover the necessary relationship between the decoder code signals in order to restore mutual orthogonality. For example, the orthogonal code aligner 330 may consider the time delays applied by the decoder code aligner 320, and determine whether those time delays result in the decoder code signals being shifted out of a mutually orthogonal relationship. If so, the orthogonal code aligner 330 may determine appropriate further time delays (or delay adjustments) to be applied to further shift the decoder code signals towards mutual orthogonality. The orthogonal code aligner 330 then outputs an orthogonal code alignment signal to the decoder delay adjustment blocks 262 to apply the further time delays to the decoder code signals, in order to maintain mutual orthogonality among the decoder code signals.

Because the decoder code signals have already been aligned with the encoder code signals, the encoder code signals should be similarly shifted in order to maintain mutual orthogonality. Thus, any time delay applied by the orthogonal code aligner 330 to the decoder code signals should also be applied to the encoder code signals. Accordingly, the orthogonal code aligner 330 also outputs the orthogonal code alignment signal to the encoder delay adjustment blocks 222 to apply the same set of time delays to the encoder code signals, in order to maintain mutual orthogonality among the encoder code signals.

In the example of FIG. 7, the orthogonal code aligner 330 determines that an adjustment of one code bit between decoder Code 2 and decoder Code 3 is required to achieve mutual orthogonality. The orthogonal code aligner 330 outputs an orthogonal code alignment signal to the decoder delay adjustment block 262 for decoder Code 3 to apply a time delay of one sampling period. The orthogonal code aligner 330 also outputs an orthogonal code alignment signal to the encoder delay adjustment block 222 for corresponding encoder Code 3 to apply a time delay of one sampling period.

In some examples, in order to maintain mutual orthogonality, it may be sufficient that codes of the same sign rate are mutually orthogonal. It may not be necessary to check for mutual orthogonality between two codes of different sign rates, because the difference in sign rate may be sufficient to ensure mutual orthogonality, regardless of the relative shift between the two codes. Accordingly, the orthogonal code aligner 330 may only need to check for mutual orthogonality among codes of the same sign rate. In the example of FIG. 7, it may be sufficient to check that decoder Code 2 and decoder Code 3 are mutually orthogonal, without having to check mutual orthogonality between decoder Code 2 or decoder Code 3 and decoder Code 1.

The result of the synchronization performed by the synchronizer 300 is that the encoder code signals and decoder code signals are synchronized with each other, the codes are mutually orthogonal, and the sampling point of the ADC is close to or at the middle of the code eye.

After synchronization has been performed, Rx signals may be received and processed by the receiver 200, for example by controlling the muxes 204 to switch to output the Rx signals instead of the known analog signal. The encoder and decoder code signals and the ADC sampling point are expected to remain synchronized for a relatively long period of time (e.g., one day), in the absence of any significant changes in the surrounding environment. A timer (e.g., internal to the receiver 200, such as a timer in the decoder 250 or the synchronizer 300, or external to the receiver) may be used to trigger the synchronizer 300 to perform synchronization at regular intervals (e.g., on a daily basis). Other triggers may be sent (e.g., from a processor external to the receiver 200) when the receiver 200 is initiated (e.g., when the communication device is powered on) or when a change has been detected (e.g., significant change in the external environment, or a change in the orthogonal code), to cause the synchronizer 300 to perform a synchronization outside of the regular intervals.

Figure 8:
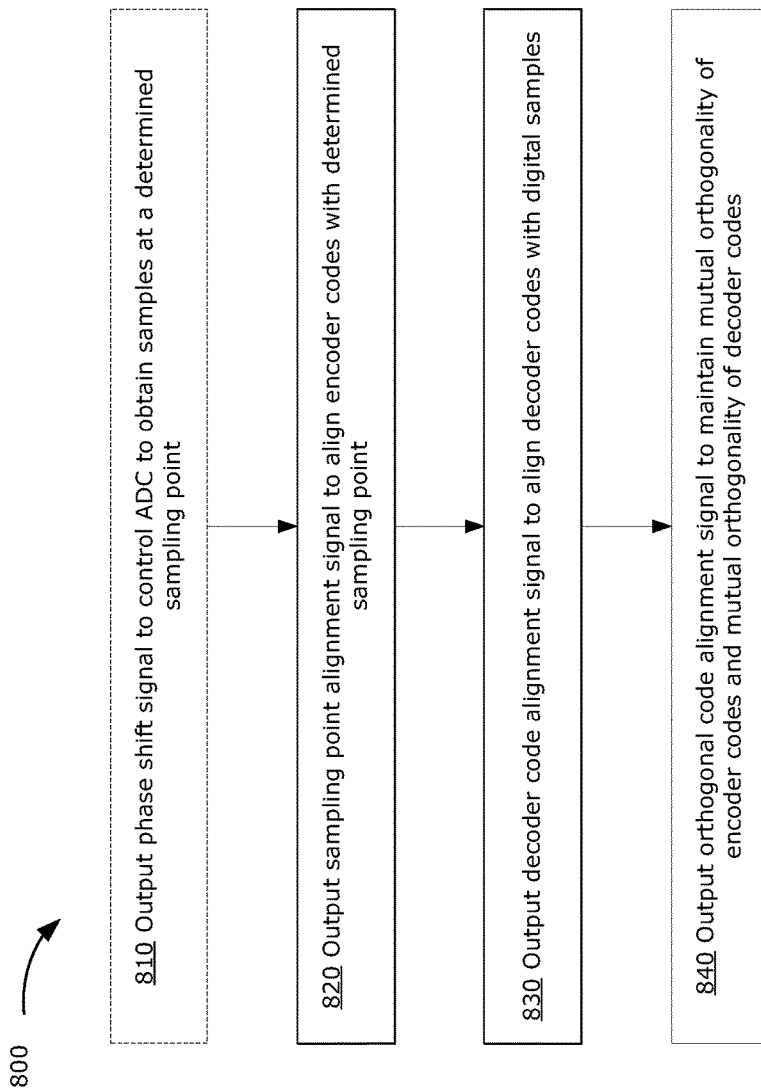
FIG. 8 is a flowchart illustrating an example method for synchronization, which may be performed by the synchronization module of FIG. 3.

FIG. 8 illustrates an example method 800 that may be performed by the synchronizer 300, to perform synchronization as described above. More generally, the method 800 may be performed by the decoder 250.

Optionally, at 810, a phase shift signal is outputted to control the ADC to obtain samples at a determined sampling point. For example, as described above, a signal carrying a known encoder code may be used to encode a known analog signal. This known encoded signal may be then sampled by the ADC and sign samples of the ADC output may be compared with the expected signs of the known encoder code (e.g., using a confidence interval or equal vote algorithm). The phase shift signal may then be outputted (e.g., from the synchronizer to a phase shifter) to adjust the sampling point of the ADC until the sign samples of the ADC output match the expected signs of the known encoder code. Generally, this optional step is performed for only one known encoder code. Once the ADC has been adjusted to achieve the desired sampling point based on one known encoder code, the ADC will not be further adjusted for other encoder codes.

At 820, a sampling point alignment signal is outputted to apply one or more time delays to the encoder code signals, to align the encoder code signals with the determined sampling point. For example, as described above, a signal carrying a known encoder code may be used to encode the known analog signal. The known encoded signal may be then sampled by the ADC and sign samples of the ADC output may be compared with the expected signs of the known encoder code (e.g., using a confidence interval or equal vote algorithm). The sampling point alignment signal may then be outputted (e.g., from the synchronizer to an encoder delay adjustment block) to adjust the time delay of the known encoder code signal until the sign samples of the ADC output match the expected signs of the known encoder code. 820 may be repeated for each encoder code, in series, until all encoder code signals have been aligned with the sampling point of the ADC. If 810 has been performed using one signal carrying the known encoder code (e.g., the encoder code with the fastest code rate), then 820 is performed for all other encoder code signals excluding the one encoder code used in 810.

At 830, a decoder code alignment signal is outputted to apply one or more time delays to the decoder code signals, to align the decoder code signals with the ADC output (which represent the encoder code signals including any path delays from the encoder code source to the ADC output). For example, as described above, a signal carrying a known encoder code may be used to encode the known analog signal. The known encoded signal may be then sampled by the ADC and sign samples of the ADC output may be cross correlated (e.g., using a cyclic cross correlation calculation performed) with the corresponding known decoder code used by the decoder. The result of the cross correlation calculation indicates the relative shift between the decoder code signal and the ADC output. The decoder code alignment signal may then be outputted (e.g., from the synchronizer to a decoder delay adjustment block) to adjust the time delay of the signal carrying the known decoder code to compensate for the relative shift. 830 may be repeated for each decoder code signal, in series, until all decoder code signals have been aligned.

At 840, at least one orthogonal code alignment signal is outputted to apply one or more time delays to the decoder and encoder code signals, in order to maintain mutual orthogonality among the encoder code signals and also among the decoder code signals. For example, as described above, the decoder codes are known and it is also known what the relationship (e.g., relative time shift) between the decoder code signals should be in order to maintain orthogonality. Thus, based on the relative shift that was determined at 830, the orthogonal code alignment signal may be outputted (e.g., from the synchronizer to the decoder delay adjustment block) to adjust the time delay of one or more decoder code signals to regain mutual orthogonality. The orthogonal code alignment may be also outputted (e.g., from the synchronizer to the encoder delay adjustment block) to similarly adjust the time delay of one or more corresponding encoder code signals to regain mutual orthogonality. In some examples, codes having different sign rates may be mutually orthogonal, regardless of relative shift. It may thus be sufficient that only codes having the same sign rate be considered at 840. At 840, all decoder code signals may be considered in parallel, or in series.

Although the synchronizer has been described as using certain blocks or modules to perform the synchronization, in some examples functions described as being carried out by separate blocks may be performed by one block. For example, a single module in the synchronizer may perform both decoder code signal alignment and orthogonal code alignment, to output both the decoder code alignment signal and the orthogonal code alignment signal. In some examples, functions described as being carried out by a single block may be performed by two or more blocks. For example, a separate cross correlator block may be used to perform cyclic cross correlation calculations.

The synchronizer described herein, as well as the decoder described herein, may be implemented using software, hardware or a mix of software and hardware. Generally, a digital decoder may be implemented using any suitable digital programmable logic.

In the examples described above, a sign-sampling technique is used to compare obtained sign samples with the signs that are expected for a known code. In other examples, such as where an amplitude technique is used, obtained amplitude samples may be compared with the amplitudes that are expected for a known code.

In the examples described herein, delay adjustments of the decoder and/or encoder code signals may be performed digitally or in analog. Similarly, switching (e.g., using muxes or switches) of the codes may be performed digitally or in analog. Generally, use of digital circuits may help avoid nonlinearity and/or avoid any clock feed-through, which may negatively impact synchronization.

The examples disclosed herein may be implemented in any suitable wireless or wired communication device, such as UEs and base stations, for example in an analog spread spectrum system. In various examples, the examples disclosed herein may be implemented in a communication device for use in a multi-band, MIMO or massive MIMO system. Examples described herein may be implemented in a cognitive radio communication system. Examples described herein may be implemented in a code division multiplexing (CDM) receiver.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method for performing synchronization in a receiver of an analog code division spreading system, the method comprising:
    outputting at least one sampling point alignment signal to apply one or more determined first time delays to encoder code signals, the encoder code signals carrying encoder codes used by an encoder for generating an orthogonal code-encoded analog signal, the one or more first time delays being determined to align the encoder code signals with a sampling point of an analog-to-digital converter (ADC), the ADC being used to obtain digital samples of the orthogonal code-encoded analog signal at the sampling point;
    outputting at least one decoder code alignment signal to apply one or more determined second time delays to decoder code signals, the decoder code signals carrying decoder codes used by a decoder for decoding the digital samples, the one or more second time delays being determined to align the decoder code signals with the digital samples; and
    outputting at least one orthogonal code alignment signal to apply one or more determined third time delays to the decoder code signals and the encoder code signals, the one or more third time delays being determined to maintain mutual orthogonality among the decoder code signals and to maintain mutual orthogonality among the encoder code signals.

2. The method of claim 1, further comprising:
    outputting a phase shift signal to control the ADC to obtain the digital samples at a determined sampling point.

3. The method of claim 2, wherein the determined sampling point is determined by:
    obtaining sign samples of digital samples of a known orthogonal code-encoded analog signal, the known orthogonal code-encoded analog signal being generated by encoding a known analog signal with a known encoder code; and
    determining the sampling point by outputting the phase shift signal to adjust the sampling point for obtaining the digital samples until the obtained sign samples match expected signs of the known encoder code.

4. The method of claim 3, wherein the known analog signal is a substantially constant analog signal.

5. The method of claim 3, wherein the known encoder code has a fastest code rate among the encoder codes.

6. The method of claim 1, wherein at least one of the one or more first time delays is determined by:
    obtaining sign samples of digital samples of a known orthogonal code-encoded analog signal, the known orthogonal code-encoded analog signal being generated by encoding a known analog signal with a known encoder code; and
    determining the at least one first time delay by adjusting time delay applied to a signal carrying the known encoder code until the obtained sign samples match expected signs of the known encoder code.

7. The method of claim 6, wherein the at least one first time delay comprises a plurality of first time delays, and the plurality of first time delays are determined, in series, for a respective plurality of signals carrying respective known encoder codes.

8. The method of claim 1, wherein at least one of the one or more second time delays is determined by:
    obtaining sign samples of digital samples of a known orthogonal code-encoded analog signal, the known orthogonal code-encoded analog signal being generated by encoding a known analog signal with a known encoder code; and
    determining the at least one second time delay by performing a cyclic cross correlation calculation to determine a relative shift between the obtained sign samples and the expected signs of the known decoder code, and determining the at least one second time delay to compensate for the relative shift.

9. The method of claim 8, wherein the at least one second time delay comprises a plurality of second time delays, and the plurality of second time delays are determined, in series, for a respective plurality of known decoder codes.

10. The method of claim 1, wherein the at least one third time delay is determined for achieving mutual orthogonality between decoder code signals having same sign rates.

11. An apparatus for performing synchronization in a receiver of an analog code division spreading system, the apparatus comprising:
    a synchronizer configured to:
        receive, from an analog-to-digital converter (ADC), digital samples of an orthogonal code-encoded analog signal, the digital samples being obtained by the ADC at a sampling point;
        output at least one sampling point alignment signal to apply one or more determined first time delays to encoder code signals, the encoder code signals being used by an encoder for generating the orthogonal code-encoded analog signal, the one or more first time delays being determined to align the encoder code signals with the sampling point of the ADC;
        output at least one decoder code alignment signal to apply one or more determined second time delays to decoder code signals, the decoder code signals being used by a decoder for decoding the digital samples, the one or more second time delays being determined to align the decoder code signals with the digital samples; and output at least one orthogonal code alignment signal to apply one or more determined third time delays to the decoder code signals and the encoder code signals, the one or more third time delays being determined to maintain mutual orthogonality among the decoder code signals and to maintain mutual orthogonality among the encoder code signals.

12. The apparatus of claim 11, wherein the synchronizer is further configured to:
output a phase shift signal to control the ADC to obtain the digital samples at a determined sampling point.

13. The apparatus of claim 12, wherein the synchronizer comprises a sign sampler, and wherein the synchronizer is further configured to determine the determined sampling point by:
obtaining, by the sign sampler, sign samples of digital samples of a known orthogonal code-encoded analog signal, the known orthogonal code-encoded analog signal being generated by encoding a known analog signal with a known encoder code; and
determining the sampling point by outputting the phase shift signal to adjust the sampling point for obtaining the digital samples until the obtained sign samples match expected signs of the known encoder code.

14. The apparatus of claim 11, wherein the synchronizer comprises a sign sampler, and wherein the synchronizer is further configured to determine at least one first time delay by:
obtaining, by the sign sampler, sign samples of digital samples of a known orthogonal code-encoded analog signal, the known orthogonal code-encoded analog signal being generated by encoding a known analog signal with a known encoder code; and
determining at least one first time delay by adjusting time delay applied to a signal carrying the known encoder code until the obtained sign samples match expected signs of the known encoder code.

15. The apparatus of claim 11, wherein the synchronizer comprises a sign sampler, and wherein the synchronizer is further configured to determine at least one second time delay by:
obtaining, by the sign sampler, sign samples of digital samples of a known orthogonal code-encoded analog signal, the known orthogonal code-encoded analog signal being generated by encoding a known analog signal with a known encoder code; and
determining at least one second time delay by performing a cyclic cross correlation calculation to determine a relative shift between the obtained sign samples and the expected signs of the known decoder code, and determining the at least one second time delay to compensate for the relative shift.

16. The apparatus of claim 11, further comprising a decoder configured to decode the digital samples, using the decoder code signals.

17. The apparatus of claim 16, further comprising one or more decoder delay adjustment blocks, wherein the synchronizer is configured to output the at least one decoder code alignment signal and the at least one orthogonal code alignment signal to the one or more decoder delay adjustment blocks.

18. A receiver in an analog code division spreading system, the receiver comprising:
a plurality of receiving paths for receiving respective analog signals, each receiving path including a respective orthogonal code-encoder to perform encoding using a respective encoder code signal;
a combiner for combining a plurality of signals outputted by the orthogonal code-encoders into a combined orthogonal code-encoded analog;
an analog-to-digital converter (ADC) for obtaining digital samples of the combined orthogonal code-encoded analog signal at a sampling point; and
a decoder for decoding the digital samples using decoder code signals, the decoder comprising a synchronizer configured to:
output at least one sampling point alignment signal to apply one or more determined first time delays to the encoder code signals, the one or more first time delays being determined to align the encoder code signals with the sampling point of the ADC;
output at least one decoder code alignment signal to apply one or more determined second time delays to the decoder code signals, the one or more second time delays being determined to align the decoder code signals with the digital samples; and
output at least one orthogonal code alignment signal to apply one or more determined third time delays to the decoder code signals and encoder code signals, the one or more third time delays being determined to maintain mutual orthogonality among the decoder code signals and to maintain mutual orthogonality among the encoder code signals.

19. The receiver of claim 18, further comprising:
a known analog signal source for providing a known analog signal; and
a plurality of multiplexers, each multiplexer corresponding to a respective one receiving path, each multiplexer being configured to selectively provide the known analog signal or the respective received analog signal to the respective encoder on the receiving path.

20. The receiver of claim 18, further comprising:
a plurality of switches, each switch corresponding to a respective transmission path for transmitting a respective encoder code signal to a respective encoder, each switch being configured to selectively enable or disable transmission of the respective encoder code signal to the respective encoder.

* * * * *